(12) United States Patent
Crump et al.

(10) Patent No.: US 8,838,624 B2
(45) Date of Patent: Sep. 16, 2014

(54) SYSTEM AND METHOD FOR AGGREGATING QUERY RESULTS IN A FAULT-TOLERANT DATABASE MANAGEMENT SYSTEM

(75) Inventors: Jeffrey M. Crump, Wakefield, MA (US); Margie E. Ioakimidis, North Chelmsford, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 352 days.

(21) Appl. No.: 12/889,574

(22) Filed: Sep. 24, 2010

(65) Prior Publication Data

US 2012/0078881 A1    Mar. 29, 2012

(51) Int. Cl.
*G06F 17/30*  (2006.01)
*G06Q 10/10*  (2012.01)

(52) U.S. Cl.
CPC ............... *G06F 17/30489* (2013.01); *G06Q 10/10* (2013.01)
USPC .......................................... 707/754; 707/770

(58) Field of Classification Search
USPC ................... 707/737, 747, 754, 770
See application file for complete search history.

(56) References Cited

U.S. PATENT DOCUMENTS

| 7,155,466 | B2 | 12/2006 | Rodriguez et al. |
| 7,725,470 | B2 * | 5/2010 | Richards et al. ............ 707/737 |
| 2002/0073068 | A1 | 6/2002 | Guha |
| 2003/0050959 | A1 | 3/2003 | Faybishenko et al. |
| 2006/0026219 | A1 | 2/2006 | Orenstein et al. |
| 2006/0095430 | A1 | 5/2006 | Zeng et al. |
| 2006/0287978 | A1 * | 12/2006 | Cunningham ................ 707/2 |
| 2007/0189153 | A1 | 8/2007 | Mason |
| 2009/0271385 | A1 | 10/2009 | Krishnamoorthy et al. |

OTHER PUBLICATIONS

What is the difference between a Disk, a Partition and a Volume?, Jun. 19, 2009, p. 1.*
What is the difference between a Disk, a Partition, and a Volume? Jun. 19, 2009, p. 1.*

* cited by examiner

*Primary Examiner* — Albert Phillips, III
(74) *Attorney, Agent, or Firm* — Mattingly & Malur, PC

(57) ABSTRACT

A redundant array of independent nodes are networked together. Each node executes an instance of an application that provides object-based storage. Metadata objects are stored in a set of regions distributed among the nodes across the array. A given region is identified by hashing a metadata object attribute and extracting a given set of bits of a resulting hash value. A method of managing query results comprises: receiving, by a first node of the plurality of independent nodes from a client application, a request for a list of objects with a criterion; issuing by the first node a query to all the nodes based on the received request; processing the query by each node over the regions in the node using the metadata objects stored in the regions; aggregating and filtering by the first node results of the query from all the nodes; and returning by the first node the aggregated and filtered results to the client application.

21 Claims, 6 Drawing Sheets

SYSTEM AND METHOD FOR AGGREGATING QUERY RESULTS IN A FAULT-TOLERANT DATABASE MANAGEMENT SYSTEM

BACKGROUND OF THE INVENTION

The present invention relates generally to storage systems and, more particularly, to system and method for aggregating query results in a fault-tolerant database management system.

Customers can have different integration needs with a content platform based on their business needs and scenarios. One common theme surrounds retrieving a list of objects and information on those objects to pass to another application in their infrastructure for a specific function (e.g., searching data or backing up data). To do this, the applications may be required to do more work to retrieve this information. For instance, the integrating application would have to traverse a directory, subdirectories, sub-subdirectories, and so forth to retrieve a list of objects and system metadata for a given criterion. This would have to be done for all directories in a namespace, across all namespaces of interest, across all tenants of interest, etc., for the case where a redundant array of independent nodes are networked together and each cluster/system of nodes is partitioned into tenants and namespaces. A namespace is a logical partition of the cluster, and essentially serves as a collection of objects particular to at least one defined application. Each namespace has a private filesystem with respect to other namespaces. Moreover, access to one namespace does not grant a user access to another namespace. A tenant is a grouping of namespace(s) and possibly other subtenants. A cluster/system is a physical archive instance. See commonly assigned U.S. patent application Ser. No. 12/609,804, filed Oct. 30, 2009, entitled Fixed Content Storage Within a Partitioned Content Platform Using Namespaces, which is incorporated herein by reference.

BRIEF SUMMARY OF THE INVENTION

Exemplary embodiments of the invention allow REST (Representational State Transfer) clients to query a content platform for lists of objects and metadata that match a given criterion without the need for the integrating application to traverse a directory, subdirectories, sub-subdirectories, and so forth to retrieve a list of objects and system metadata for the given criterion. For example, a client application may query by change time, query by directory, query by transaction (create, delete, purge), query by namespace, or page through results. With this invention, a single content platform node distributes the query to all regions across all the nodes in the content platform system and the same node sorts the results before returning the list back to the client application. In this way, the content platform system shoulders more of the burden of this work by querying across all the nodes in the content platform system, filtering and sorting the results, and then returning the results to the client application.

An aspect of the present invention is directed to a redundant array of independent nodes networked together, wherein each node executes an instance of an application that provides object-based storage, wherein metadata objects are stored in a set of regions distributed among the nodes across the array, and wherein a given region is identified by hashing a metadata object attribute and extracting a given set of bits of a resulting hash value. A method of managing query results comprises: receiving, by a first node of the plurality of independent nodes from a client application, a request for a list of objects with a criterion; issuing by the first node a query to all the nodes based on the received request; processing the query by each node over the regions in the node using the metadata objects stored in the regions; aggregating and filtering by the first node results of the query from all the nodes; and returning by the first node the aggregated and filtered results to the client application.

In some embodiments, processing the query by each node comprises providing the results of the query in sets to the first node, and the results of the query from all the nodes are aggregated and filtered and returned to the client application in sets. The method further comprises after returning by the first node a current set of the aggregated and filtered results to the client application, awaiting a request from the client application for a next set of results before requesting and retrieving the next set of results from all the nodes. Providing the results of the query in sets to the first node comprises providing a preset number of objects from each region as a result of processing the query. The method further comprises sorting by the first node the aggregated and filtered results to produce a preset ordering. The request includes one or more of query by change time, query by directory, query by transaction, query by namespace, and page through results.

Another aspect of the invention is directed to an apparatus for managing query results in a redundant array of independent nodes networked together, wherein each node executes an instance of an application that provides object-based storage, wherein metadata objects are stored in a set of regions distributed among the nodes across the array, and wherein a given region is identified by hashing a metadata object attribute and extracting a given set of bits of a resulting hash value. The apparatus comprising a processor, a memory, and a query results management module provided for each of the nodes. The query results management module is configured to: if the node having the query results management module is a first node which receives from a client application a request for a list of objects with a criterion, issue a query to all the nodes based on the received request; process the query over the regions in the node using the metadata objects stored in the regions; and if the node having the query results management module is the first node, aggregate and filter results of the query from all the nodes, the aggregated and filtered results to be returned to the client application.

In specific embodiments, a node comprises a metadata manager to manage the metadata objects in the node which includes organizing and providing access to the metadata objects, wherein the metadata manager includes the query results management module of the node.

Another aspect of this invention is directed to a computer-readable storage medium storing a plurality of instructions for controlling a data processor to manage query results in a redundant array of independent nodes networked together, wherein each node executes an instance of an application that provides object-based storage, wherein metadata objects are stored in a set of regions distributed among the nodes across the array, wherein a given region is identified by hashing a metadata object attribute and extracting a given set of bits of a resulting hash value, and wherein the computer-readable storage medium is provided in each node. The plurality of instructions comprises instructions that cause the data processor, if the node having the computer-readable storage medium is a first node which receives from a client application a request for a list of objects with a criterion, to issue a query to all the nodes based on the received request; instructions that cause the data processor to process the query over the regions in the node using the metadata objects stored in the regions; and instructions that cause the data processor, if the node having the computer-readable storage medium is the first node, to aggregate and filter by the first node results of the query from all the nodes, the aggregated and filtered results to be returned to the client application.

These and other features and advantages of the present invention will become apparent to those of ordinary skill in the art in view of the following detailed description of the specific embodiments.

DETAILED DESCRIPTION OF THE INVENTION

Figure 1:
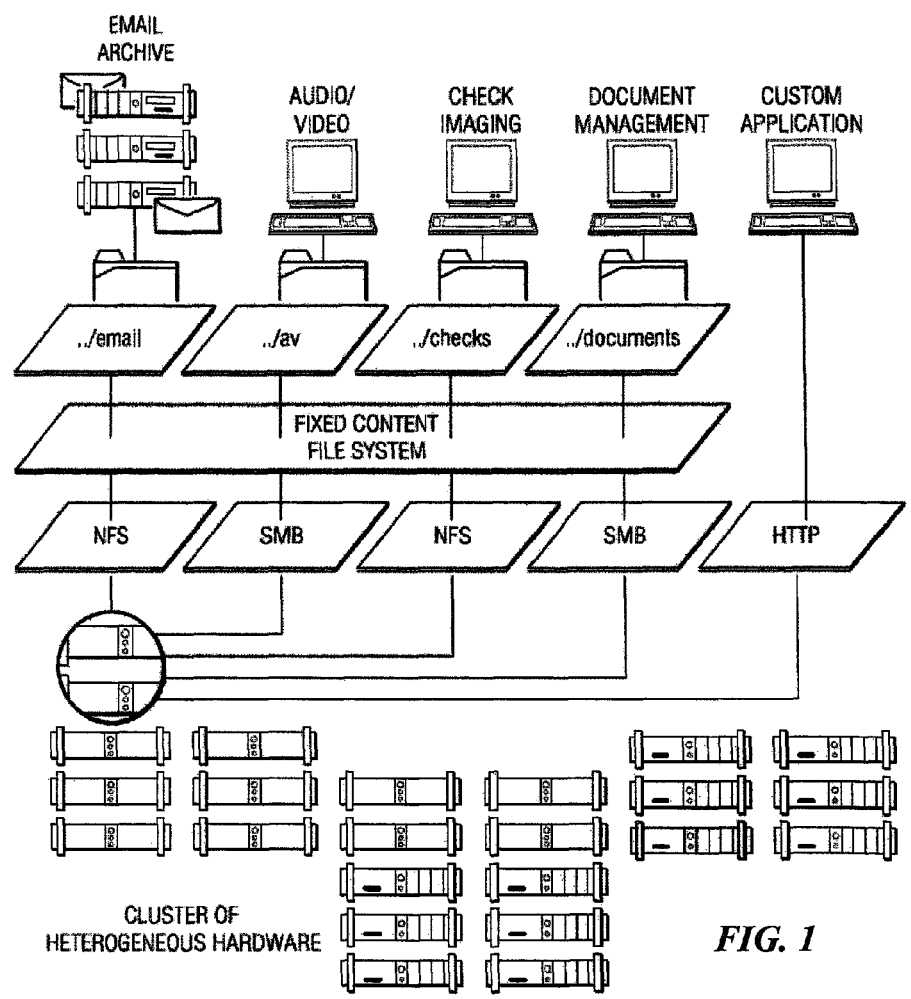
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for aggregating query results in a fault-tolerant database management system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
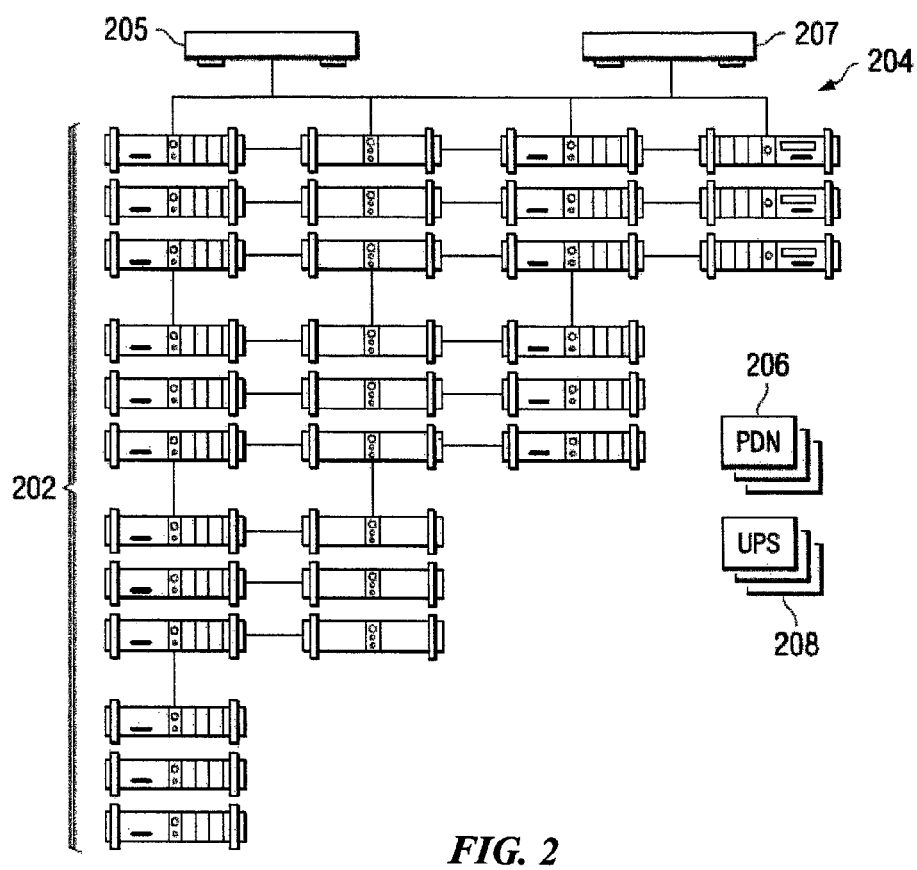
FIG. 2 is a simplified representation of a redundant array of independent nodes each of which is symmetric and supports an archive cluster application.

As described in commonly-owned U.S. Pat. No. 7,155, 466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
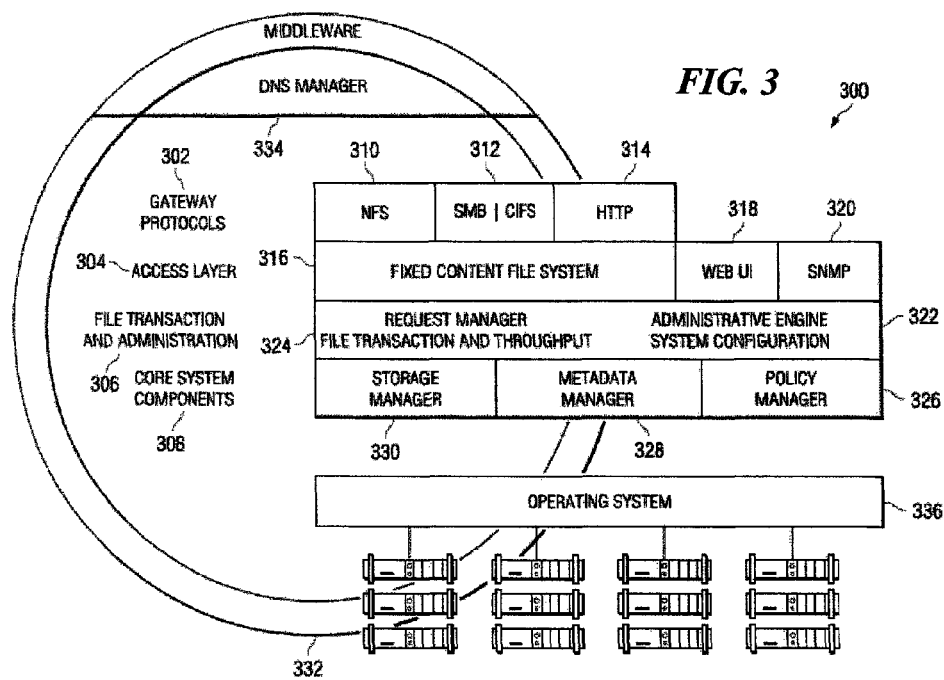
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. The external file (EF) stores the information that will be needed subsequently in query with the Query Engine. By way of example, this metadata includes without limitation: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publications 2007/0189153 and 2006/0026219, which are incorporated herein by reference.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

ExternalFile: a file as perceived by a user of the archive;

InternalFile: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully-qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

Figure 4:
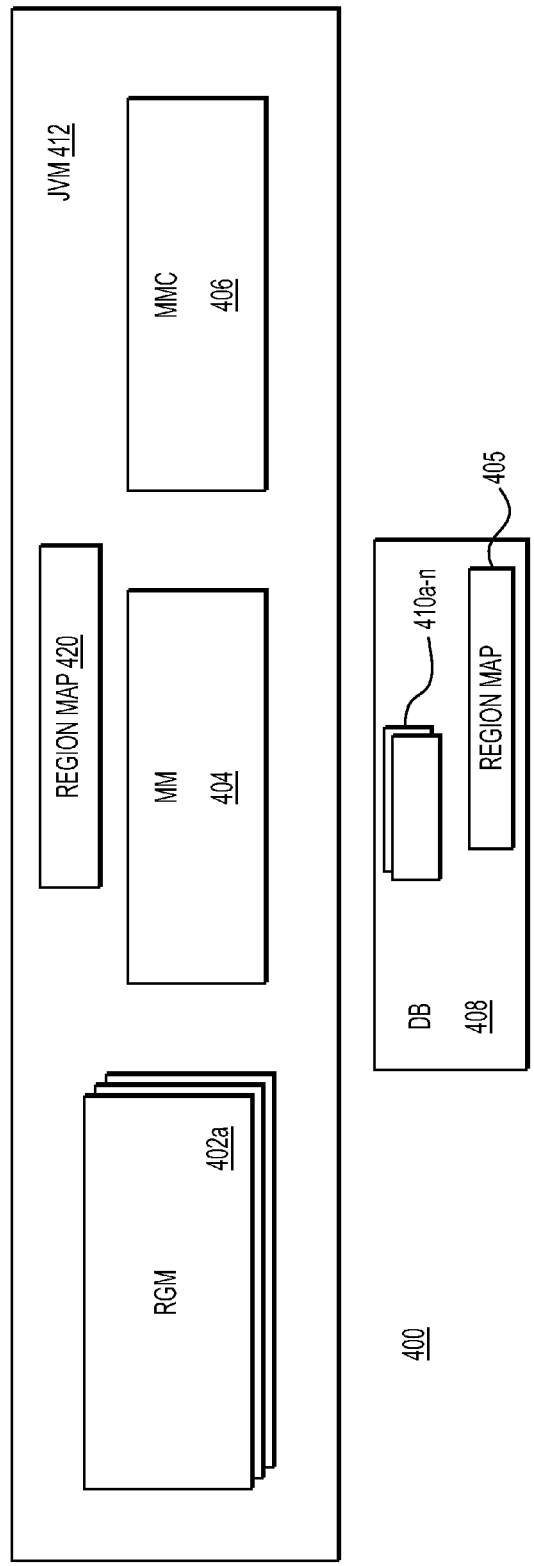
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Patent Publication 2006/0026219.

III. Aggregating Query Results by a Node

Exemplary embodiments of the invention allow REST (Representational State Transfer) clients to query a content platform for lists of objects and metadata that match a given criterion without the need for the integrating application to traverse a directory, subdirectories, sub-subdirectories, and so forth to retrieve a list of objects and system metadata for the given criterion. Features of this invention include the ability for a client application to query by change time, query by directory, query by transaction (create, delete, purge), query by namespace, and page through results, etc. A single content platform node distributes the query to all regions across all the nodes in the content platform system and the same node sorts the results before returning the list back to the client application. According to specific embodiments, the database query is implemented in the Metadata Manager.

"Change time" is the time at which the object (specifically, its metadata, since the content in the content platform system is read-only) was last modified by a user. For example, the time is measured in the number of milliseconds since Jan. 1, 1970. "Query By Directory" is the act of retrieving all the objects in the content platform system that logically reside in the same filesystem directory. The content platform system accomplishes this by executing a SQL query against its database. "Query By Transaction" is the act of retrieving all the objects in the content platform system whose most recent access was by a certain type of operation. For example, it could return all the objects whose most recent activity was their creation, or all objects that were most recently deleted. "Query By Namespace" is the act of retrieving all the objects, and only those objects, in a particular content platform system namespace. "Page Through Results" is the act of iterating over the result set of a query in sets, rather than in individual objects. For instance, a query might be satisfied by 1000 objects. In a traditional iteration, the client would retrieve and examine those objects one at a time, requiring 1000 iterations. In a paging scheme, they are returned to the client in batches of 50, 100, or some other number, which reduces the number of iterations necessary to traverse the results.

III.A. Query Definition

Figure 5:
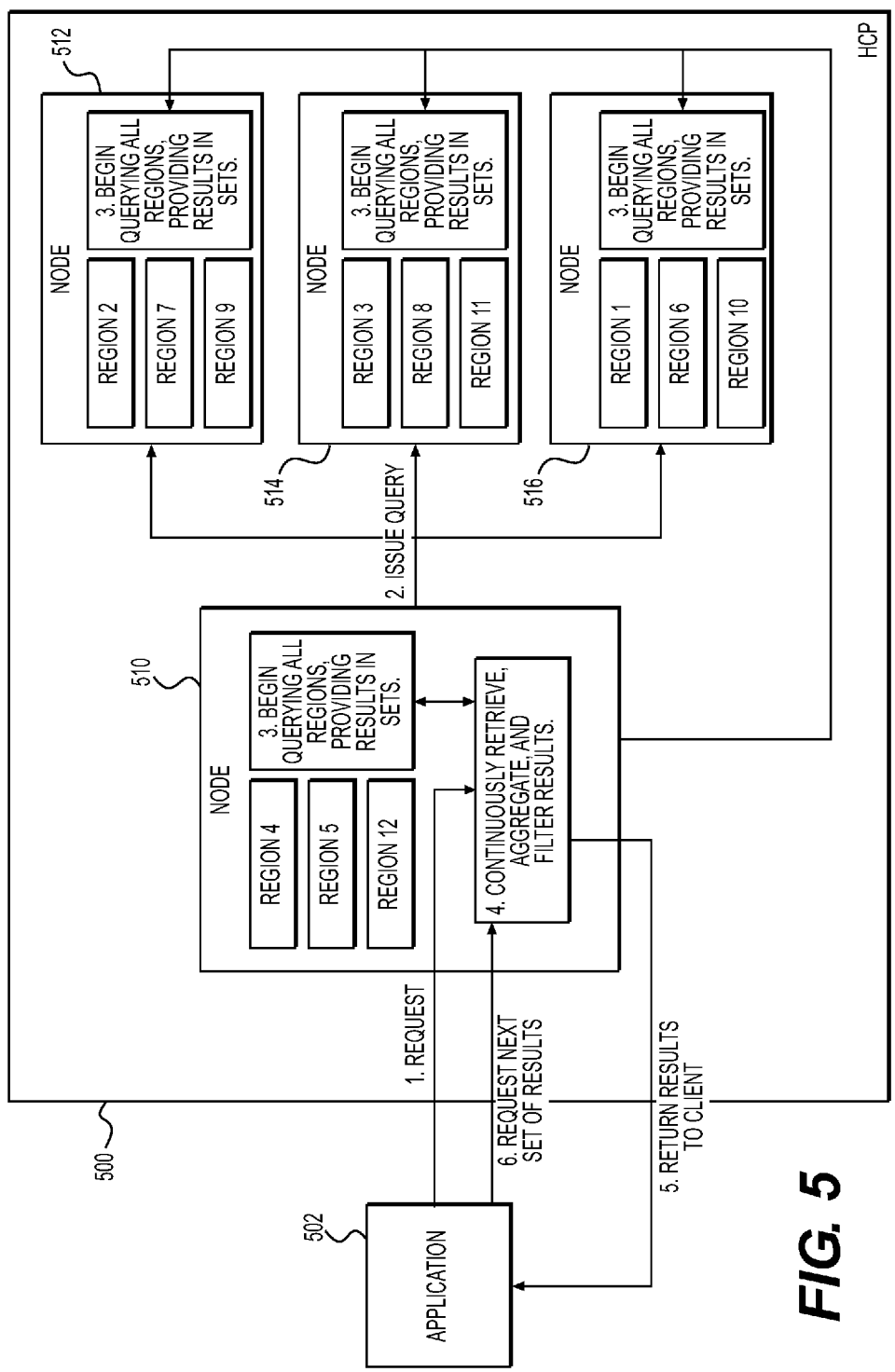
FIG. 5 is a simplified block diagram of a content platform illustrating the distribution of a query from a client application by a single node to all other nodes and aggregating the query results to be returned to the client application.

FIG. 5 is a simplified block diagram of a content platform 500 illustrating the distribution of a query from a client application 502 by a single node 510 to all other nodes 512, 514, 516. The results of the query are then filtered and sorted before they are returned to the HTTP client application 502. The content platform 500 includes a redundant array of independent nodes that are networked together. The query is processed in each node to provide results of the query by finding objects that fit the criterion of the query. Filtering the query results means including in a result set only results that match the criterion or criteria given by the REST client. Objects are filtered by operation type (i.e., "created," "deleted," "metadata changed," etc.). For example, if the client only wishes to see transaction=create records, all records visited and only records that match transaction=create are included.

In step 1, the application 502 sends a query to the first node or leading node which is the query distributing node 510. In step 2, based on the request received from the application 502, the first node 510 issues a query to each of the other nodes 512, 514, 516 in the content platform 500. In step 3, each node in the content platform 500 begins querying all authoritative regions within the node and provides results in sets. In step 4, the first node 510 continuously retrieves, aggregates, and filters and sorts the results from all the nodes. In step 5, the first node 510 returns a set of results to the application 502. In step 6, the application 502 may issue a request the next set of results to the first node 510, and the above steps 2-5 are repeated. Each region preferably maps to a database optimized to handle query on the object change time through the use of a database index.

Figure 6:
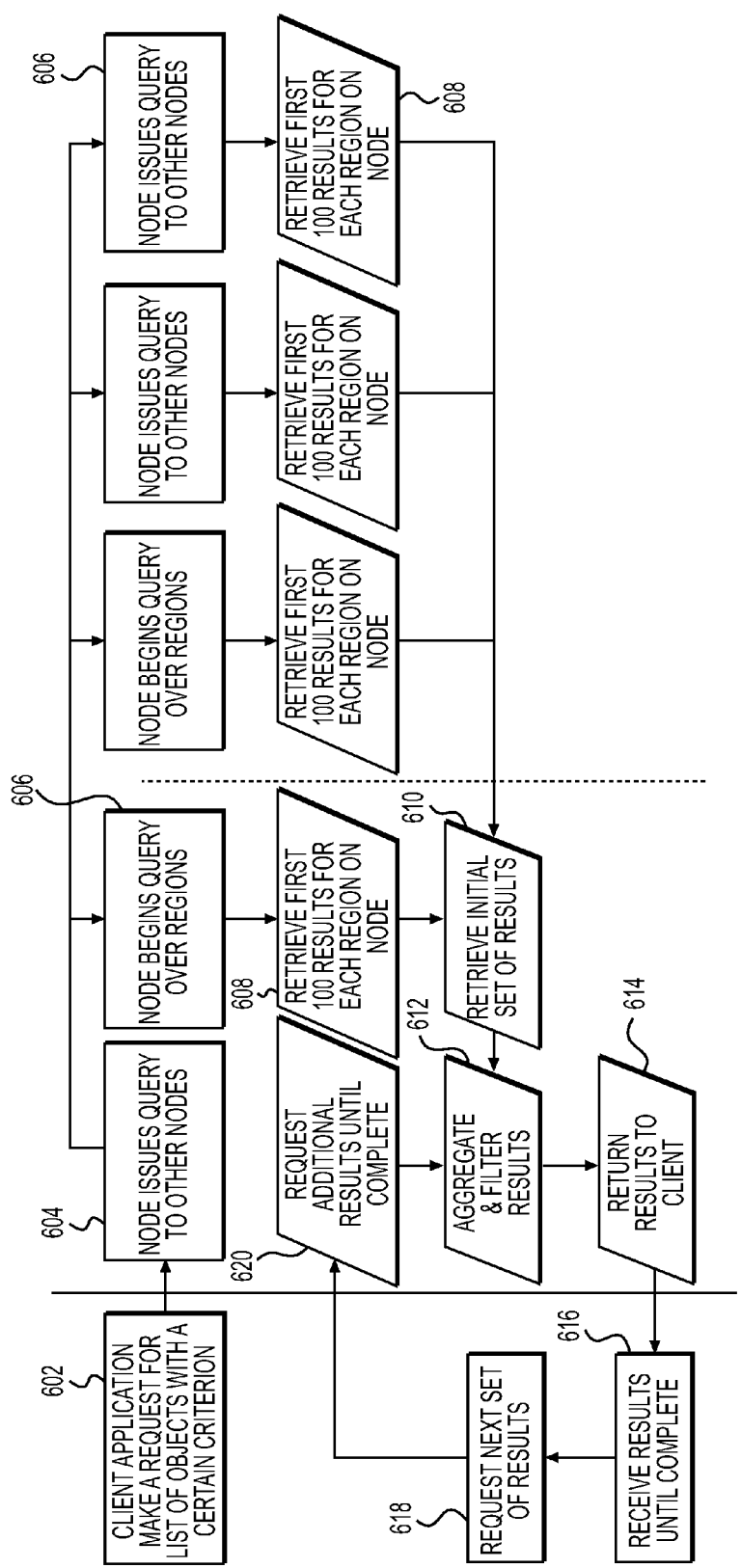
FIG. 6 is an example of a flow diagram illustrating a process for distributing a query from a client application by a single node to all other nodes and aggregating and returning results of the query to the client application by the single node.

FIG. 6 is an example of a flow diagram illustrating a process for distributing the query from the client application 502 by the first node 510 to all other nodes and aggregating and returning results of the query to the client application 502. In this example, the query selects 100 objects in the supplied UUID (Universal Unique Identifier), directory paths, and change_times. The ordering produced by the query is (uuid, change_time, fn_hash).

In step 602, the client application 502 makes a request for a list of objects with a certain criterion. In step 604, the first node 510 which receives the request issues a query to all the other nodes. In step 606, each node begins query over the regions therein. In step 608, each node retrieves the first 100 results for each region on the node. In step 610, the first node 510 retrieves the initial set of results from all the nodes. In step 612, the first node aggregates and filters and sorts the results (this is done continuously until the client application 502 stops requesting the next set of results). In step 614, the first node 510 returns the results to the client application 502. In step 616, the client application receives the results until completion (this is done until the client application 502 stops requesting the next set of results). In step 618, the client application 502 sends a request for the next set of results to the first node 502. In step 620, the first node 502 request additional results aggregated and filtered and sorted from all the nodes until completion (this is done until the client application 502 stops requesting the next set of results).

The process of managing the query results (i.e., issuing and processing query, and aggregating and filtering results of the query) may be implemented in a query results management module. In specific embodiments, the query results management module is provided in the metadata manager in each node of the content platform.

III.B. CPExternalFileQueryRequest

The CPExternalFileQueryRequest is a request from the Metadata Manager Client to a specific Authoritative region number. The request returns 1 batch from the external_file table which fits the QueryParameters. The CPExternalFileQueryRequest will invoke the same query as that described in the previous section. As described above, the query is ordered by (uuid, change_time, fn_hash). Before returning the batch, the list is further sorted (in memory) to produce this exact ordering:

(uuid, change_time, fn_hash, directory, file_name, version_id).

This feature may be implemented as a software module to provide communication between the first node 510 and the other nodes for requesting the next set/batch of results. The "uuid" is a universally unique identifier for an object. In this case, it identifies the namespace in which the object resides. The "change_time" reflects the date and time at which the record was last modified. The "fn_hash" represents the result of applying a hash function to the name of an object in a namespace, and is used as shorthand for identifying the object. See U.S. Patent Publication 2006/0026219. The "version_id" is a unique identifier for a particular version of an object in a namespace.

III.C. RemoteQueryBatchIterator

The RemoteQueryBatchIterator is a simple extension of a BatchIterator which sends CPExternalFileQueryRequest messages to retrieve batches. This differs very slightly from typical implementations of BatchIterator which usually query local regions. The query engine is bound to a specific region number and map size on creation. This feature may be implemented as a software module to issue a query from the first node 510 to the other nodes when the first node 510 receives a request for a list of objects with a certain criterion from the client application 502.

III.D. ExternalFileQuery

The ExternalFileQuery class is the MetadataManagerClient Operation implementation which will merge across all of the query engines in the system. Since each query engine returned from the RemoteQueryBatchIterator is strictly ordered, a PriorityQueueIterator can merge across these query engines efficiently. The resulting query is ordered correctly across all regions. The query returned will be of type MetadataIterator<ExternalFile>. This feature may be implemented as a software module to aggregate and filter the results collected by the first node 502 from all the nodes.

The algorithm for merging across all regions is fairly straightforward: (1) iterate all regions in a give node, (2) create RemoteQueryBatchIterator (Region, QueryParameters), (3) create PriorityQueueIterator (Collection<RemoteQueryBatchIterator> iterators, QueryKeyExtractor), and (4) return PriorityQueueIterator.

According to specific embodiments of the invention, the technology for aggregating query results described above is part of the Metadata Query Engine which helps provide support for content platform integration with search engines, backup servers, policy engines, applications using RBS, applications using XAM, or the like.

Of course, the system configurations illustrated in FIGS. 1 and 5 are purely exemplary of a storage archive in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for aggregating query results in a fault-tolerant database management system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a system having a plurality of nodes, wherein metadata objects are stored in a set of regions distributed among the nodes across the system, wherein a region is identified by hashing a metadata object attribute, a method of managing query results comprising:
   receiving, by a first node of the plurality of independent nodes from a client application, a request for a list of objects with a criterion, the request including a query for namespace which identifies a namespace;
   issuing by the first node a query to all the nodes based on the received request;
   processing the query by each node over the regions in the node using the metadata objects stored in the regions;
   aggregating and filtering by the first node results of the query from particular nodes of the plurality of nodes, the particular nodes being associated with the namespace identified by the query for namespace; and
   returning by the first node the aggregated and filtered results to the client application.

2. The method according to claim 1,
   wherein processing the query by each node comprises providing the results of the query in sets to the first node; and
   wherein the results of the query from the particular nodes are aggregated and filtered and returned to the client application in sets.

3. The method according to claim 2, further comprising:
   after returning by the first node a current set of the aggregated and filtered results to the client application, awaiting a request from the client application for a next set of results before requesting and retrieving the next set of results from the particular nodes.

4. The method according to claim 2,
   wherein providing the results of the query in sets to the first node comprises providing a preset number of objects from each region as a result of processing the query.

5. The method according to claim 1, further comprising:
   sorting by the first node the aggregated and filtered results to produce a preset ordering.

6. The method according to claim 1,
   wherein the request includes one or more of query by change time, query by directory, and query by transaction.

7. The method according to claim 1,
wherein the region comprises an authoritative region copy and zero or more backup region copies acting as backup for the authoritative region copy,
wherein the first node issues the query to the nodes which have the authoritative region copy, and
wherein each node which has the authoritative region copy processes the query over the authoritative region copy in said each node.

8. An apparatus comprising a processor and a memory and which manages query results in a system having a plurality of nodes, wherein metadata objects are stored in a set of regions distributed among the nodes across the system, wherein a region is identified by hashing a metadata object attribute, the apparatus comprising a processor, a memory, and a query results management module provided for each of the nodes, the query results management module being configured to:
if the node having the query results management module is a first node which receives from a client application a request for a list of objects with a criterion, issue a query to all the nodes based on the received request, the request including a query for namespace which identifies a namespace;
process the query over the regions in the node using the metadata objects stored in the regions; and
if the node having the query results management module is the first node, aggregate and filter results of the query from particular nodes of all the plurality of nodes, the particular nodes being associated with the namespace identified by the query for namespace, the aggregated and filtered results to be returned to the client application.

9. The apparatus according to claim 8,
wherein processing the query comprises providing the results of the query in sets to the first node; and
wherein the results of the query from the particular nodes are aggregated and filtered to be returned to the client application in sets.

10. The apparatus according to claim 9,
wherein providing the results of the query in sets to the first node comprises providing a preset number of objects from each region as a result of processing the query.

11. The apparatus according to claim 9,
wherein if the node having the query results management module is the first node, the query results management module is configured, after returning by the first node a current set of the aggregated and filtered results to the client application, to await a request from the client application for a next set of results before requesting and retrieving the next set of results from the particular nodes.

12. The apparatus according to claim 8,
wherein if the node having the query results management module is the first node, the query results management module is configured to sort the aggregated and filtered results to produce a preset ordering.

13. A node in the redundant array of independent nodes according to claim 8, the node comprising a metadata manager to manage the metadata objects in the node which includes organizing and providing access to the metadata objects, wherein the metadata manager includes the query results management module of the node.

14. The apparatus according to claim 8,
wherein the region comprises an authoritative region copy and zero or more backup region copies acting as backup for the authoritative region copy,
wherein the first node issues the query to the nodes which have the authoritative region copy, and
wherein each node which has the authoritative region copy processes the query over the authoritative region copy in said each node.

15. A non-transitory computer-readable storage medium storing a plurality of instructions for controlling a data processor to manage query results in a system having a plurality of nodes, wherein metadata objects are stored in a set of regions distributed among the nodes across the system, wherein a region is identified by hashing a metadata object attribute, wherein the computer-readable storage medium is provided in each node, the plurality of instructions comprising:
instructions that cause the data processor, if the node having the computer-readable storage medium is a first node which receives from a client application a request for a list of objects with a criterion, to issue a query to all the nodes based on the received request the request including a query for namespace which identifies a namespace;
instructions that cause the data processor to process the query over the regions in the node using the metadata objects stored in the regions; and
instructions that cause the data processor, if the node having the computer-readable storage medium is the first node, to aggregate and filter by the first node results of the query from particular nodes of the plurality of nodes, the particular nodes being associated with the namespace identified by the query for namespace, the aggregated and filtered results to be returned to the client application.

16. The non-transitory computer-readable storage medium according to claim 15,
wherein processing the query comprises providing the results of the query in sets to the first node; and
wherein the results of the query from the particular nodes are aggregated and filtered and returned to the client application in sets.

17. The non-transitory computer-readable storage medium according to claim 16, wherein the plurality of instructions further comprise:
instructions that cause the data processor, if the node having the computer-readable storage medium is the first node, after returning by the first node a current set of the aggregated and filtered results to the client application, to await a request from the client application for a next set of results before requesting and retrieving the next set of results from the particular nodes.

18. The non-transitory computer-readable storage medium according to claim 16,
wherein providing the results of the query in sets to the first node comprises providing a preset number of objects from each region as a result of processing the query.

19. The non-transitory computer-readable storage medium according to claim 15, wherein the plurality of instructions further comprise:
instructions that cause the data processor, if the node having the computer-readable storage medium is the first node, to sort by the first node the aggregated and filtered results to produce a preset ordering.

20. The non-transitory computer-readable storage medium according to claim 15,
wherein the request includes one or more of query by change time, query by directory, and query by transaction.

21. The non-transitory computer-readable storage medium according to claim 15, wherein the region comprises an authoritative region copy and zero or more backup region copies acting as backup for the authoritative region copy, wherein the plurality of instructions further comprise instructions that cause the data processor, if the node having the computer-readable storage medium is the first node, to issue the query to the nodes which have the authoritative region copy, and wherein the plurality of instructions further comprise instructions that cause the data processor, if the node having the computer-readable storage medium has the authoritative region copy, to process the query over the authoritative region copy in the node.

* * * * *